(12) United States Patent  
Fujimori

(10) Patent No.: US 7,761,520 B2  
(45) Date of Patent: Jul. 20, 2010

(54) INFORMATION MANAGEMENT SYSTEM, INFORMATION MANAGEMENT APPARATUS AND COMPUTER-READABLE STORAGE MEDIUM

(75) Inventor: Takafumi Fujimori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1097 days.

(21) Appl. No.: 11/020,206

(22) Filed: Dec. 27, 2004

(65) Prior Publication Data

US 2006/0010488 A1 Jan. 12, 2006

(30) Foreign Application Priority Data

Jul. 7, 2004 (JP) ............................ 2004-200649

(51) Int. Cl.
- *G06F 15/16* (2006.01)
- *G06F 15/173* (2006.01)
- *H04L 12/26* (2006.01)
- *H04L 12/28* (2006.01)

(52) U.S. Cl. .................. 709/206; 709/220; 709/224; 726/6; 370/252

(58) Field of Classification Search .............. 726/6; 709/206, 220, 224; 370/252

See application file for complete search history.

(56) References Cited

U.S. PATENT DOCUMENTS

| | | | | |
|---|---|---|---|---|
| 6,170,005 B1 * | 1/2001 | Meandzija | ................ | 709/217 |
| 6,226,788 B1 * | 5/2001 | Schoening et al. | ........... | 717/107 |
| 6,240,457 B1 * | 5/2001 | Bell | ............... | 709/230 |
| 6,360,258 B1 * | 3/2002 | LeBlanc | ................ | 709/223 |
| 6,539,422 B1 * | 3/2003 | Hunt et al. | ................ | 709/217 |
| 6,654,759 B1 * | 11/2003 | Brunet et al. | ................ | 707/101 |
| 6,697,845 B1 * | 2/2004 | Andrews | ................ | 709/209 |
| 6,799,220 B1 * | 9/2004 | Merritt et al. | ................ | 709/238 |
| 6,981,038 B2 * | 12/2005 | McKenzie et al. | ........... | 709/223 |
| 7,099,947 B1 * | 8/2006 | Nadeau et al. | .............. | 709/229 |
| 7,249,359 B1 * | 7/2007 | McCloghrie et al. | ......... | 719/318 |
| 7,275,094 B1 * | 9/2007 | McCloghrie et al. | ......... | 709/223 |

(Continued)

FOREIGN PATENT DOCUMENTS

JP 2002-215479 8/2002

OTHER PUBLICATIONS

European Search Report mailed Apr. 29, 2005 in corresponding European Patent Application No. 04 25 8154.

(Continued)

*Primary Examiner*—William C Vaughn, Jr.  
*Assistant Examiner*—Muktesh G Gupta  
(74) *Attorney, Agent, or Firm*—Fujitsu Patent Center

(57) ABSTRACT

A server system has a function to send management information in response to a management information transmission order from an external manager as well as relates to a server which is a component of the server system. It is capable of acquiring object management information by specifying the same object ID both when a manager acquires server management information via a management section and when the manager instructs a server directly to send management information. Not only the management section, but also the servers use SNMP proxy functions. Also, the same objects as those defined in the MIB tree of the management section are defined in the MIB tree of each server and SNMP proxy settings are made for each server in such a way as to convert the OIDs of the defined objects into desired OIDs in the MIB tree of the server itself.

14 Claims, 12 Drawing Sheets

U.S. PATENT DOCUMENTS

| | | | |
|---|---|---|---|
| 7,310,664 B1 * | 12/2007 | Merchant et al. | 709/220 |
| 7,328,260 B1 * | 2/2008 | Muthiyan et al. | 709/224 |
| 7,356,841 B2 * | 4/2008 | Wilson et al. | 726/15 |
| 2002/0023258 A1 * | 2/2002 | Elwahab et al. | 717/122 |
| 2002/0191562 A1 * | 12/2002 | Kumaki et al. | 370/331 |
| 2003/0131118 A1 | 7/2003 | Lee | |
| 2005/0027850 A1 * | 2/2005 | Menzies et al. | 709/223 |
| 2005/0080886 A1 * | 4/2005 | Croy et al. | 709/223 |
| 2006/0047801 A1 * | 3/2006 | Haag et al. | 709/223 |
| 2006/0092861 A1 * | 5/2006 | Corday et al. | 370/256 |

OTHER PUBLICATIONS

Raz, D. et al., "An SNMP Application Level Gateway for Payload Address Translation" Information RFC, Oct. 2000, pp. 1-20.

D. Harrington et al., "An Architecture for Describing SNMP Management Frameworks", Request for Comments, Jan. 1998, pp. 1-56.

D. Levy et al., "SNMPv3 Applications", Request for Comments, Jan. 1998, pp. 1-70.

* cited by examiner

| SERVER NAME | SERVER IP ADDRESS | SERVER IDENTIFICATION OBJECT NAME | SERVER IDENTIFICATION OID |
|---|---|---|---|
| SERVER A | 10.10.10.10 | SERVER A INFORMATION | 1.2.2.1 |
| SERVER B | 10.10.10.20 | SERVER B INFORMATION | 1.2.2.2 |

Fig. 11

INFORMATION MANAGEMENT SYSTEM, INFORMATION MANAGEMENT APPARATUS AND COMPUTER-READABLE STORAGE MEDIUM

BACKGROUND OF THE INVENTION

1. Field of the Invention

The present invention relates to a server system which has a function to send management information in response to a management information transmission order from an external manager as well as relates to a server which is a component of the server system.

2. Description of the Related Art

Conventionally, server systems have a function to send various management information to external managers in response to orders from the external managers. SNMP (Simple Network Management Protocol) are used widely as a means of implementing this function (Japanese Patent Application Laid-Open No. 2002-215479).

FIG. 1 is an explanatory diagram illustrating a basic system management method which employs SNMP.

Each of servers 6, 7, and 8 under management has an agent 2 which is equipped with an SNMP processing section 3, tree-structured MIB (Management Information Base) 4, and management information acquisition section 5. The SNMP processing section 3 accepts SNMP orders from a manager 1, identifies OIDs (Object Identifiers), and makes management information acquisition requests. The management information acquisition section 5 acquires individual pieces of management information and sets their values. When an information acquisition order is issued by the manager 1 to the SNMP processing section 3, the SNMP processing section 3 acquires the ordered information from the management information acquisition section 5 and returns a response to the manager 1. In such a system management method, individual pieces of management information are managed in a MIB 4.

FIG. 2 is a diagram showing a configuration example of a MIB tree.

Individual pieces of management information are called objects and can be identified by OIDs. The names of the branches in the tree in FIG. 2 represent objects and the OID of each object is given by a combination of numerals in parentheses. For example, the OID of an object called memory module in FIG. 2 is expressed as ".1.1.2". The manager 1 can acquire and set values of desired objects using OIDs.

FIG. 3 is an explanatory diagram illustrating another example of a system management method which employs SNMP.

In management of multiple servers in a system, in addition to the method described with reference to FIG. 1, a configuration, in which a manager 1 can manage multiple servers 6, 7, and 8 collectively by accessing only a single management section (such as a server equipped with management functions) 10 as shown in FIG. 3, has been going mainstream recently. In this configuration, when an information acquisition order is issued by the manager 1 to a SNMP processing section 3 of the management section 10 as indicated by solid lines 12, management information is acquired from a management information acquisition section 5 of a predetermined server via a management information collecting section 11 according to an ordered OID. The acquired management information is passed to the manager 1 by the SNMP processing section 3 also via the management information collecting section 11. The method in which a management section manages servers in a system collectively is effective especially for a configuration, such as a blade server, which has a management section and multiple servers in a system and the management method shown in FIG. 3 is used widely in such a configuration. In the management method shown in FIG. 3, SNMP is used between the manager 1 and management section 10, but any protocol, such as IPMI (Intelligent Platform Management Interface), can be used between the management section 10 and servers 6, 7, and 8.

Alternatively, SNMP may be used for information exchange between the manager 10 and servers 6, 7, and 8. This can be implemented using SNMP proxy functions which come standard on SNMP functions.

FIG. 4 is an explanatory diagram illustrating a system management method which uses SNMP for information exchange between a management section and servers. Only two servers 6 and 7 are shown here.

Referring to FIG. 4, the management section 10 and servers 6 and 7 each have an agent 2 which is equipped with an SNMP processing section 3, MIB 4, and management information acquisition section 5. Besides, the management section 10 is equipped with a SNMP proxy functional section 14. To use proxy functions, it is necessary to define objects in a MIB tree of the management section 10 in advance, allowing the manager 1 to identify the servers 6 and 7. Then, objects which identify the servers 6 and 7, IP addresses of the servers, and desired objects in the MIB trees defined in the servers should be defined in proxy settings. When the manager 1 gives an SNMP order to the agent 2 of the management section 10 using the OIDs of the objects which identify servers, the management section 10 can convert the OIDs according to the settings via the SNMP proxy functional section 14, transfer the SNMP order to the servers, and thereby acquire management information from the servers.

In this management configuration, as in the case of FIG. 3, the manager 1 can manage the servers 6 and 7 collectively via the management section 10 (route 16 indicated by solid lines). Besides, since an SNMP processing section 3 is provided on each of the servers 6 and 7, the manager 1 can also manage the servers 6 and 7 by accessing them directly (route 15 indicated by broken lines) as in the case of FIG. 1. In this way, with the configuration in FIG. 4, the manager 1 can manage the servers 6 and 7 via any of the two routes 15 and 16.

FIG. 5 is a diagram showing a configuration example of a MIB tree of the management section in the system configuration in FIG. 4. FIG. 6 is a diagram showing a configuration example of a MIB tree of the servers 6 and 7 in the system configuration in FIG. 4.

A concrete example of a method for acquiring management information via the two routes 15 and 16 is described with reference to FIGS. 1 to 6.

In the configuration example of the MIB tree of the management section 10 in FIG. 4, objects "server A information" and "server B information" used to identify the servers are defined under "server information group" as shown in FIG. 5. A configuration example of a MIB tree of the servers 6 and 7 is defined as shown in FIG. 6. In FIG. 4, the IP addresses of the management section 10 and servers 6 and 7 are given by expression (1).

[Formula 1]

$$\left.\begin{array}{l} IP \text{ address of management section} = 10.10.10.1 \\ IP \text{ address of server } A = 10.10.10.10 \\ IP \text{ address of server } B = 10.10.10.20 \end{array}\right\} \quad (1)$$

For example, if SNMP proxy settings in the management section 10 are configured as shown in expressions (2) and (3), in the case of expression (2), an object (server A information) with an OID of ".1.2.2.1" in the MIB tree of the management section 10 is converted into an object (common server information) with an OID of ".1.2.2.100" in the MIB tree at an IP address of 10.10.10.10 (server 6). Similarly, in the case of expression (3), an object (server B information) with an OID of ".1.2.2.2" in the MIB tree of the management section 10 is converted into an object (common server information) with an OID of ".1.2.2.100" in the MIB tree at an IP address of 10.10.10.20 (server 7)

[Formula 2]

$$\text{proxy } 10.10.10.10 \, .1.2.2.1 \, .1.2.2.100 \quad (2)$$

$$\text{proxy } 10.10.10.20 \, .1.2.2.2 \, .1.2.2.100 \quad (3)$$

In such a case, if it is desired to acquire CPU information about the servers 6 and 7 via the agent 2 of the management section 10, if an snmp command such as the one given by expression (4) is executed by the manager 1 with respect to the SNMP processing section 3 of the management section 10, the SNMP processing section 3 of the management section 10 makes a processing request to the SNMP proxy functional section 14 because it can be seen, by comparing the settings of expression (2) with the ordered OID, that proxying is required. With reference to settings of expression (2), the SNMP proxy functional section 14 converts ".1.2.2.1" in the OID into ".1.2.2.100" and returns the resulting OID to the SNMP processing section 3. The SNMP processing section 3 requests the SNMP processing section 3 of the server 6 whose IP address is 10.10.10.10 to acquire information. The SNMP processing section 3 of the server 6 acquires CPU information whose OID is ".1.2.2.100.2" from the management information acquisition section 5 and passes the acquired information to the manager 1 via the agent 2 of the management section 10. Similarly, by executing an snmp command such as the one given by expression (5), it is possible to acquire CPU information about the server 7 via the agent 2 of the management section 10.

[Formula 3]

$$\text{snmpget } 10.10.10.1 \, .1.2.2.1.2 \quad (4)$$

$$\text{snmpget } 10.10.10.1 \, .1.2.2.2.2 \quad (5)$$

FIG. 7 is a flowchart of processes performed by the manager to acquire management information (MIB data) following the route 16 indicated by solid lines in FIG. 4.

The manager 1 gives an SNMP transmission order to the SNMP processing section 3 of the agent 2 of the management section 10 (step S101). Upon receiving the SNMP transmission order (step S102), the SNMP processing section 3 of the management section 10 judges whether the ordered OID requires proxy transfer (step S103). If it is found that proxy transfer is required, the SNMP processing section 3 of the management section 10 requests the SNMP proxy functional section 14 to convert the OID (step S104).

Incidentally, if the ordered OID does not require proxy transfer (see "OID group which does not require proxy transfer" in FIG. 5), meaning that management information in the management section is ordered to be transferred, the management information acquisition section 5 of the management section 10 acquires management information about the desired object in the management section 10 and sends it to the manager 1 via the SNMP processing section 3.

If the ordered OID requires proxy transfer (step S103), the SNMP proxy functional section 14 is requested to convert the OID (step S104). The SNMP proxy functional section 14 converts the OID with reference to the proxy settings of expressions (2) and (3) (step S105) and returns the converted OID to the SNMP processing section 3 (step S106). The SNMP processing section 3 of the management section 10 sends the converted OID to the destination of proxy transfer (server 6 or 7) together with a processing request (step S107). When the SNMP processing section 3 of the server 6 or 7 receives the processing request (step S108), the management information acquisition section 5 of the server acquires MIB data of the ordered OID (step S109). The SNMP processing section 3 of the server receives the MIB data from its own management information acquisition section 5 and sends it to the requesting management section 10 (step S110). The SNMP processing section 3 of the management section 10 receives the MIB data and passes it to the requesting SNMP proxy functional section 14 once (step S111), the SNMP proxy functional section 14 receives the MIB data and sends it to the requesting SNMP processing section 3 (step S112), the SNMP processing section 3 receives the MIB data and sends it to the requesting manager 1 (step S113), and the manager 1 receives the MIB data (step S114).

The description will be continued returning to FIG. 4.

To acquire CPU information by accessing the agent 2 of the server 6 directly, the manager 1 executes an snmp command such as the one given by expression (6) with respect to the SNMP processing section 3 of the server 6 and the SNMP processing section 3 acquires CPU information whose OID is ".1.2.2.100.2" from the management information acquisition section 5 and passes the acquired information to the manager 1. Similarly, by executing an snmp command such as the one given by expression (7), it is possible to acquire CPU information about the server 7 by accessing the agent 2 of the server 7 directly.

[Formula 4]

$$\text{snmpget } 10.10.10.10 \, .1.2.2.100.2 \quad (6)$$

$$\text{snmpget } 10.10.10.20 \, .1.2.2.100.2 \quad (7)$$

FIG. 8 is a flowchart of processes performed by the manager 1 to acquire management information (MIB data) following the route 15 indicated by broken lines in FIG. 4.

When the manager 1 gives an SNMP transmission order, for example, to the server 7 (or the server 6) (step S201), the SNMP processing section 3 of the agent 2 of the server 7 receives the SNMP order (step S202), the management information acquisition section 5 of the agent 2 of the server 7 acquires MIB data of the ordered OID (step S203), the SNMP processing section 3 receives the MIB data acquired by the management information acquisition section 5 and sends it to the requesting manager 1 (step S204), and the manager 1 receives the MIB data (step S205).

In the prior art examples in which multiple servers in a system are managed centrally, with a configuration such as the one shown in FIG. 3, there is a problem in that since the manager can use only one route to acquire management information from servers, the manager cannot acquire management information if the management section goes down.

The above problem is solved if the manager uses two routes to acquire management information as shown in FIG. 4, but as can be seen by comparing expression (4) with expression (6) or by comparing expression (5) with expression (7), even when acquiring the same management information in the same server, the manager 1 must specify a different OID depending on which acquisition route is used (15 or 16), and thus MIB management information in the manager 1 becomes complicated with increases in the number of servers.

SUMMARY OF THE INVENTION

The present invention has been made in view of the above circumstances and provides a server system equipped with a management section and servers, for example, as shown in FIG. 4 and capable of acquiring object management information by specifying the same object ID both when a manager acquires server management information via the a management section and when the manager instructs a server directly to send management information as well as provides a server which can be incorporated into the server system.

The present invention provides a server system having at least one server and a management section which acquires management information stored in the server, wherein:

each of the at least one server has:
  a management information acquisition section which acquires management information stored in the server itself,
  communications section which can receive both management information transmission order containing a first ID and management information transmission order containing a second ID, where the first ID is an ID of a given object including a server ID of a given server among server-specific server IDs used to distinguish the at least one server from one another while the second ID is an ID of the given object including a common server ID which indicates a server without distinguishing the at least one server from one another and which is used within the management information acquisition section, the given server being the server itself and the given object being management information to be acquired from the given server, and
  a first ID conversion section which converts the first ID contained in a management information transmission order received by the communications section into a second ID which represents the same given object as the given object represented by the first ID;
  the management information acquisition section acquires management information, which is the given object identified by the second ID;
  the communications section sends the management information acquired by the management information acquisition section to an orderer of the management information;
the management section has:
  a first communications section which receives a management information transmission order containing a first ID from an external manager, where the first ID is an ID of a given object including a server ID of a given server out of the at least one server, the given object being management information to be acquired from the given server,
  a second ID conversion section which converts the first ID contained in a management information transmission order received by the first communications section into a second ID containing the common server ID which is used within the management information acquisition section and which represents the same given object as the given object represented by the first ID, and
  a second communications section which sends a management information transmission order containing the second ID obtained by the second ID conversion section to the given server and receives management information returned from the given server; and
  the first communications section sends the management information received by the second communications section to the manager which is the orderer of the management information.

In the server system according to the present invention, since each server has the same function as the manager, namely the function of converting the first ID into the second ID, the manager can order and receive server management information via the management section as well as order and receive the server management information directly from the server using the same ID (first ID).

In the server system according to the present invention, the first ID conversion section installed in each server may have:
  a first conversion table which associates the server ID of the server itself with the common server ID, and
  a first system table which contains the server ID of the server itself and the common server ID and describes a system of the IDs of objects constituting management information which can be transmitted, the system of the IDs being linked to the common server ID and being common among all servers; and
  the first ID conversion section may convert the first ID into the second ID with reference to the first conversion table and the first system table.

Also, in the server system according to the present invention, the second ID conversion installed in the management section may have:
  a second conversion table which associates a communications address of each of the at least one server, the server ID of each of the at least one server, and the common server ID with one another, and
  a second system table which contains the server ID of each of the at least one server and the common server ID and describes a system of the IDs of objects constituting management information which can be transmitted, the system of the IDs being linked to the common server ID and being common among all servers; and
  the second ID conversion section may convert the first ID into the second ID with reference to the second conversion table and the second system table.

Also, in the server system according to the present invention, preferably the management section has a correspondence table which associates the communications address of each of the at least one server and the server ID of each of the at least one server with each other, and a second conversion table creating section which creates the second conversion table with reference to the correspondence table; and preferably the second conversion table creating section manages the correspondence table and makes additions/updates to the second conversion table in accordance with additions/updates to the correspondence table.

By managing the correspondence table in this way and making additions/updates to the second conversion table in accordance with additions/updates to the correspondence table, it is possible to create an up-to-date second conversion table in accordance with any addition or change of servers in the server system and refer to the second conversion table during ID conversion.

When the management section has the correspondence table, preferably the first ID conversion section installed in each server has:
  a first conversion table which associates the server ID of the server itself with the common server ID, and
  a first system table which contains the server ID of the server itself and the common server ID and describes a system of the IDs of objects constituting management information which can be transmitted, the system of the IDs being linked to the common server ID and being common among all servers;

the first ID conversion section converts the first ID into the second ID with reference to the first conversion table and the first system table; and each of the at least one server has a first conversion table creating section which creates the first conversion table with reference to the correspondence table in the management section.

This configuration allows the server to create a first conversion table with reference to the correspondence table in the management section and refer to the first conversion table during ID conversion.

The present invention provides a server in a server system having at least one server and a management section which acquires management information stored in the server, the server having:

a management information acquisition section which acquires management information stored in the server itself;

communications section which can receive both management information transmission order containing a first ID and management information transmission order containing a second ID, where the first ID is an ID of a given object including a server ID of a given server among server-specific server IDs used to distinguish the at least one server from one another while the second ID is an ID of the given object including a common server ID which indicates a server without distinguishing the at least one server from one another and which is used within the management information acquisition section, the given server being the server itself and the given object being management information to be acquired from the given server; and a first ID conversion section which converts the first ID contained in a management information transmission order received by the communications section into a second ID which represents the same given object as the given object represented by the first ID, wherein the management information acquisition section acquires management information, which is the given object identified by the second ID, and the communications section sends the management information acquired by the management information acquisition section to an orderer of the management information.

Also, in the server according to the present invention, the first ID conversion section may have:

a first conversion table which associates the server ID of the server itself with the common server ID, and a first system table which contains the server ID of the server itself and the common server ID and describes a system of the IDs of objects constituting management information which can be transmitted, the system of the IDs being linked to the common server ID and being common among all servers; and the first ID conversion section may convert the first ID into the second ID with reference to the first conversion table and the first system table.

In this case, the server may have a first conversion table creating section which creates the first conversion table with reference to a correspondence table that exists in the management section and associates the communications address of each of the at least one server and the server ID of each of the at least one server with each other.

As described above, according to the present invention, the manager can specify the same object ID both when acquiring server management information via the management section and when requesting a server directly to send server management information.

BRIEF DESCRIPTION OF THE DRAWINGS

FIG. 11 is a diagram showing an example of a correspondence table owned by an automatic SNMP proxy setting functional section of the management section 10.

DETAILED DESCRIPTION OF THE INVENTION

An embodiment of the present invention is described below.

Figure 9:
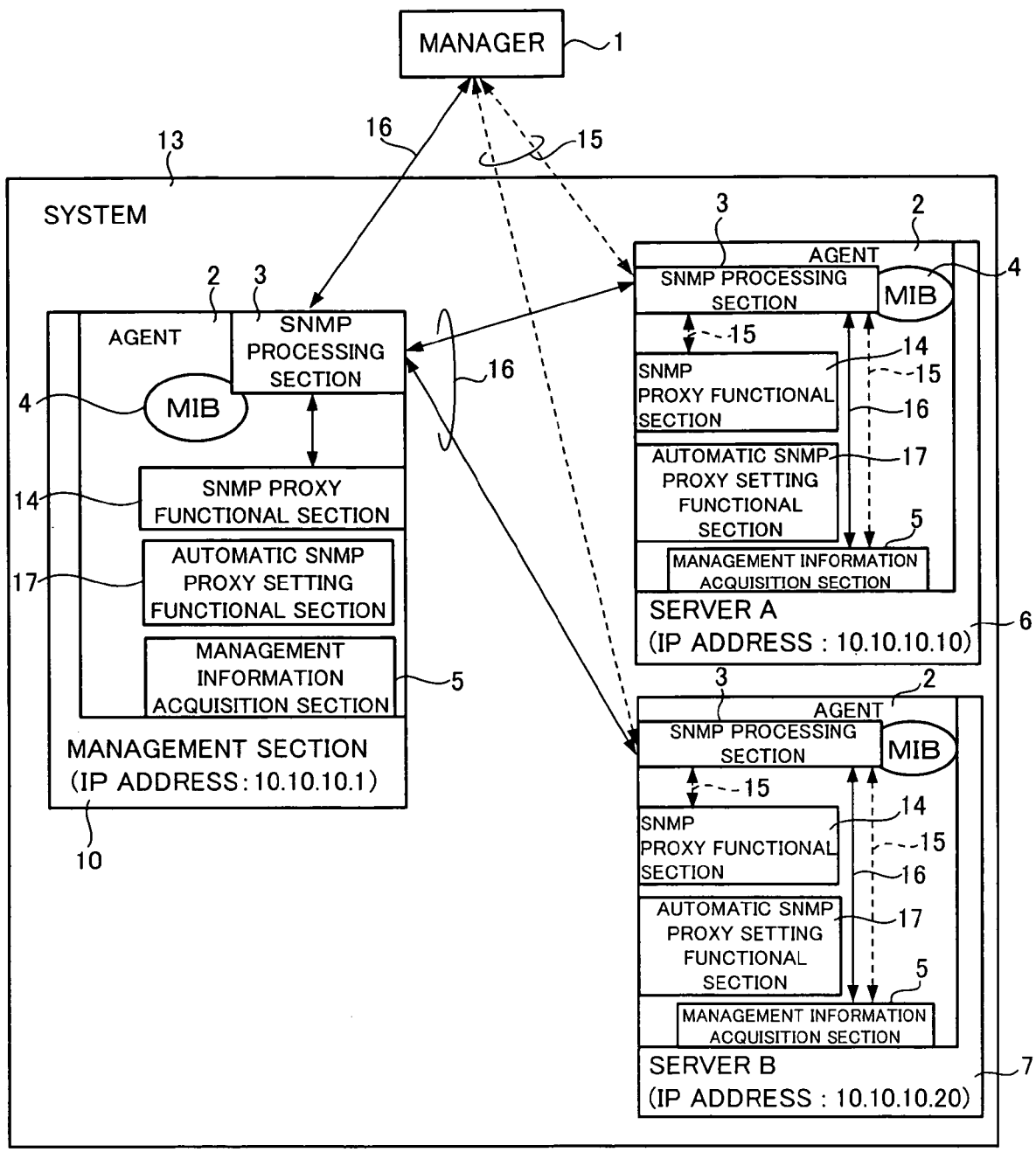
FIG. 9 is a system block diagram showing an embodiment of a server system according to the present invention.

FIG. 9 is a system block diagram showing an embodiment of a server system according to the present invention.

Here we are concerned with acquisition of management information (MIB data). The roles of servers 6 and 7 as servers are irrelevant, and thus description thereof is omitted.

Figure 1:
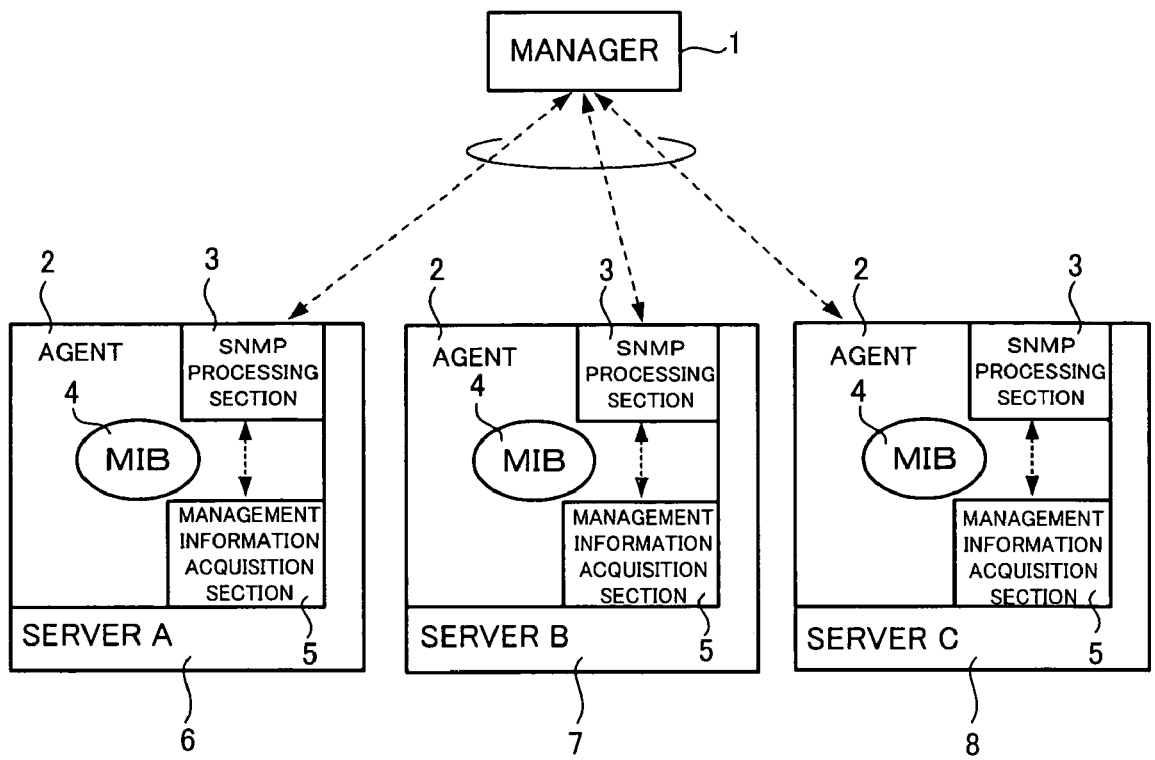
FIG. 1 is an explanatory diagram illustrating a basic system management method which employs SNMP.
Figure 2:
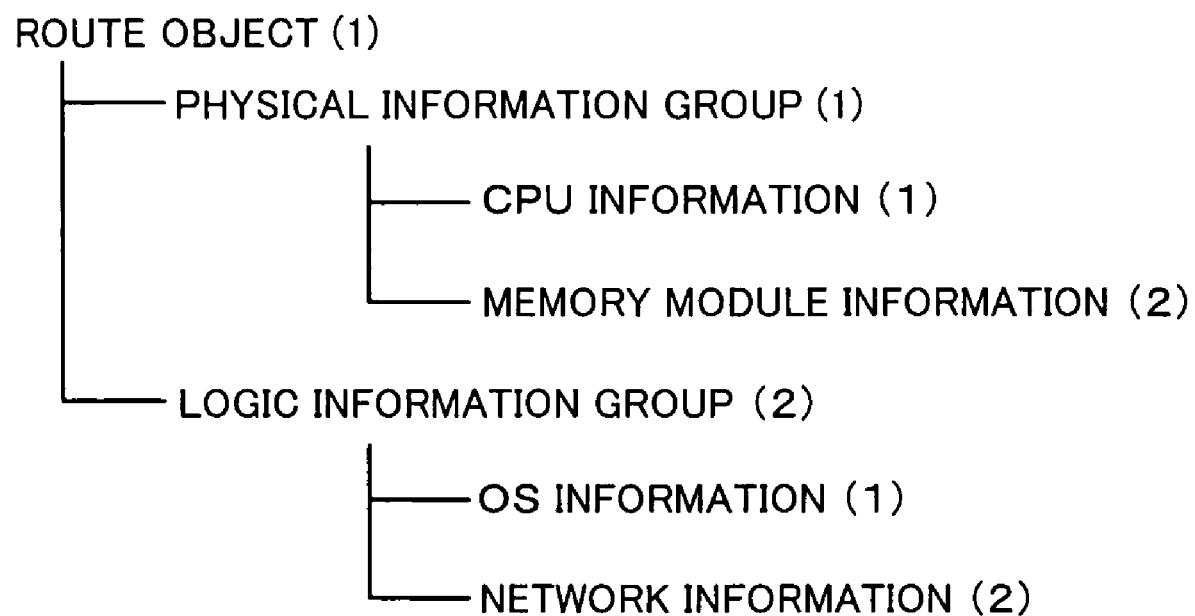
FIG. 2 is a diagram showing a configuration example of a MIB tree.
Figure 3:
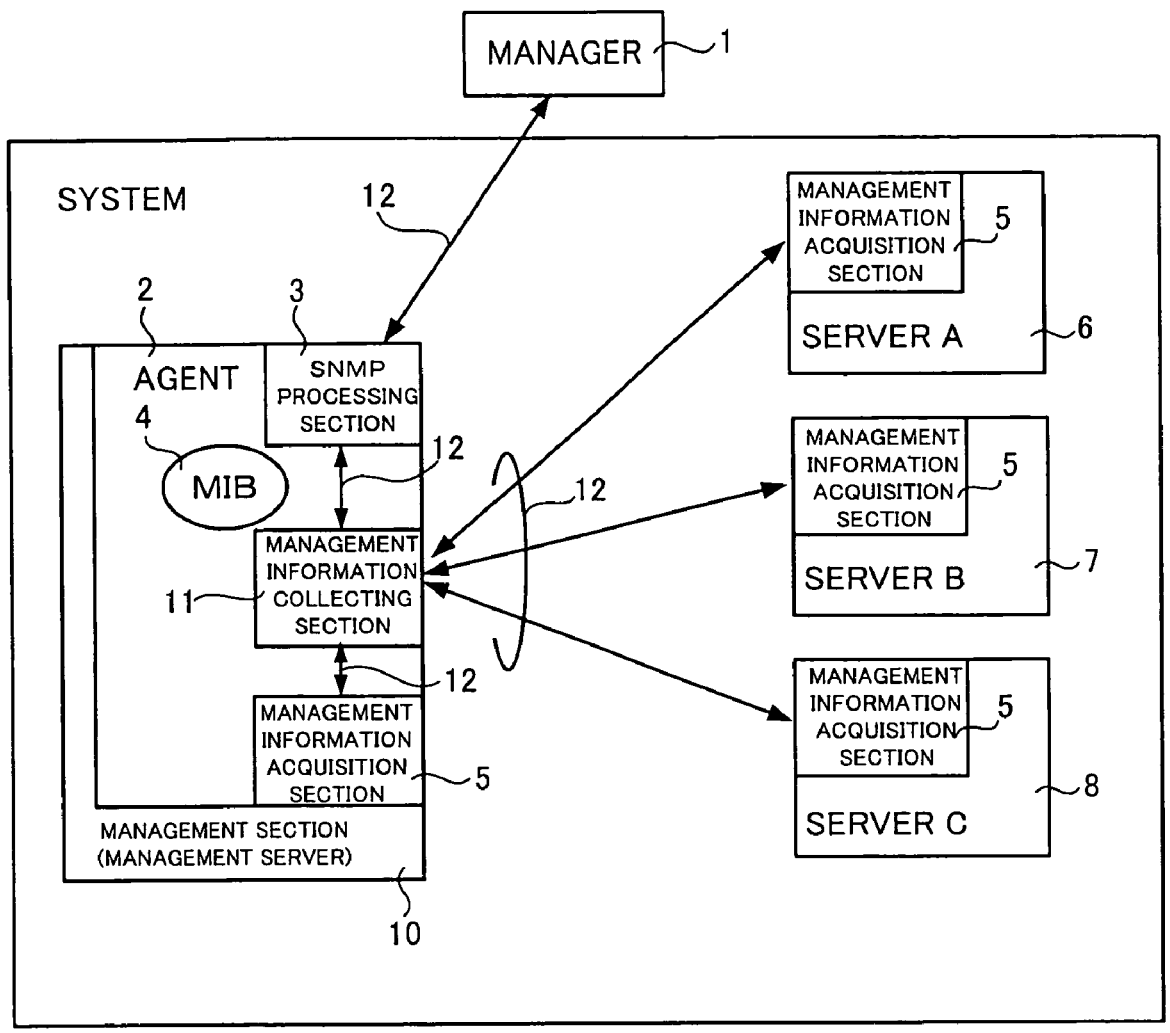
FIG. 3 is an explanatory diagram illustrating another example of a system management method which employs SNMP.
Figure 4:
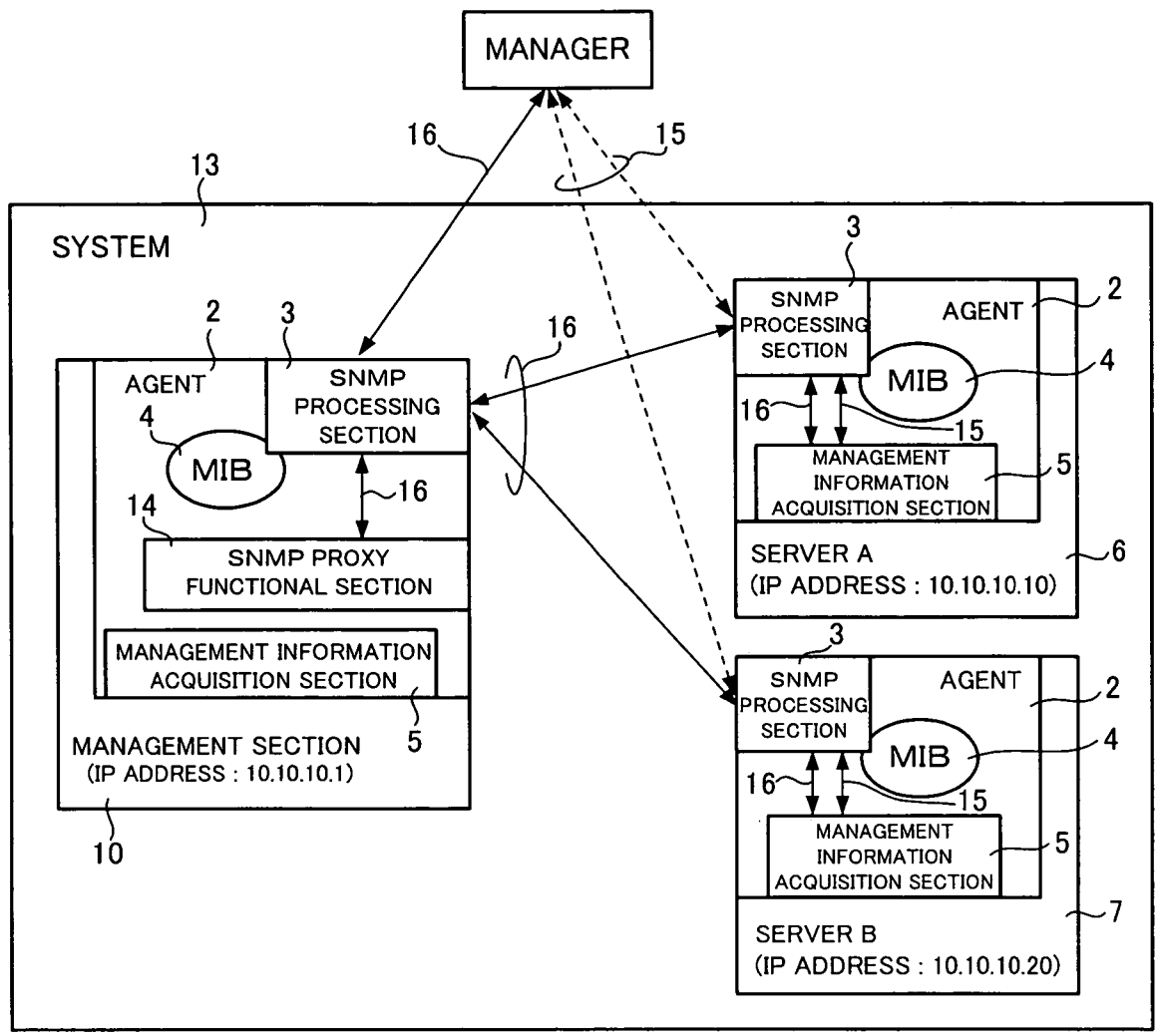
FIG. 4 is an explanatory diagram illustrating a system management method which uses SNMP for information exchange between a management section and servers.

Compared with the system shown in FIG. 4, a system 13 shown in FIG. 9 has an automatic SNMP proxy setting functional section 17 added to an agent 2 of a management section 10 and agent 2 of each of servers 6 and 7. Besides, the agent 2 of each of the servers 6 and 7 also contains an SNMP proxy functional section 14.

Figure 10:
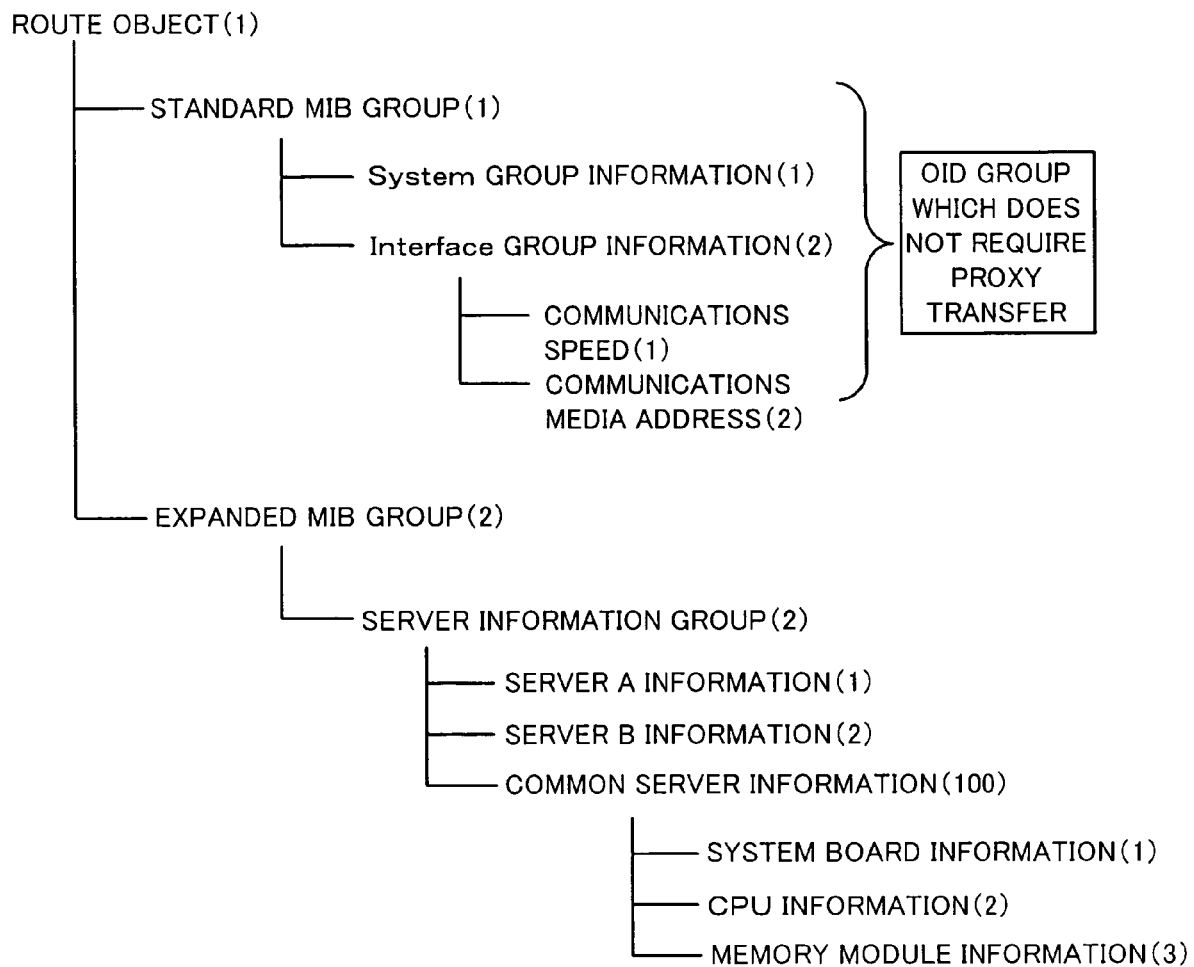
FIG. 10 is a diagram showing a configuration example of a MIB tree of the servers in the system in FIG. 9.

FIG. 10 is a diagram showing a configuration example of a MIB tree of the servers 6 and 7 in the system in FIG. 9.

Figure 5:
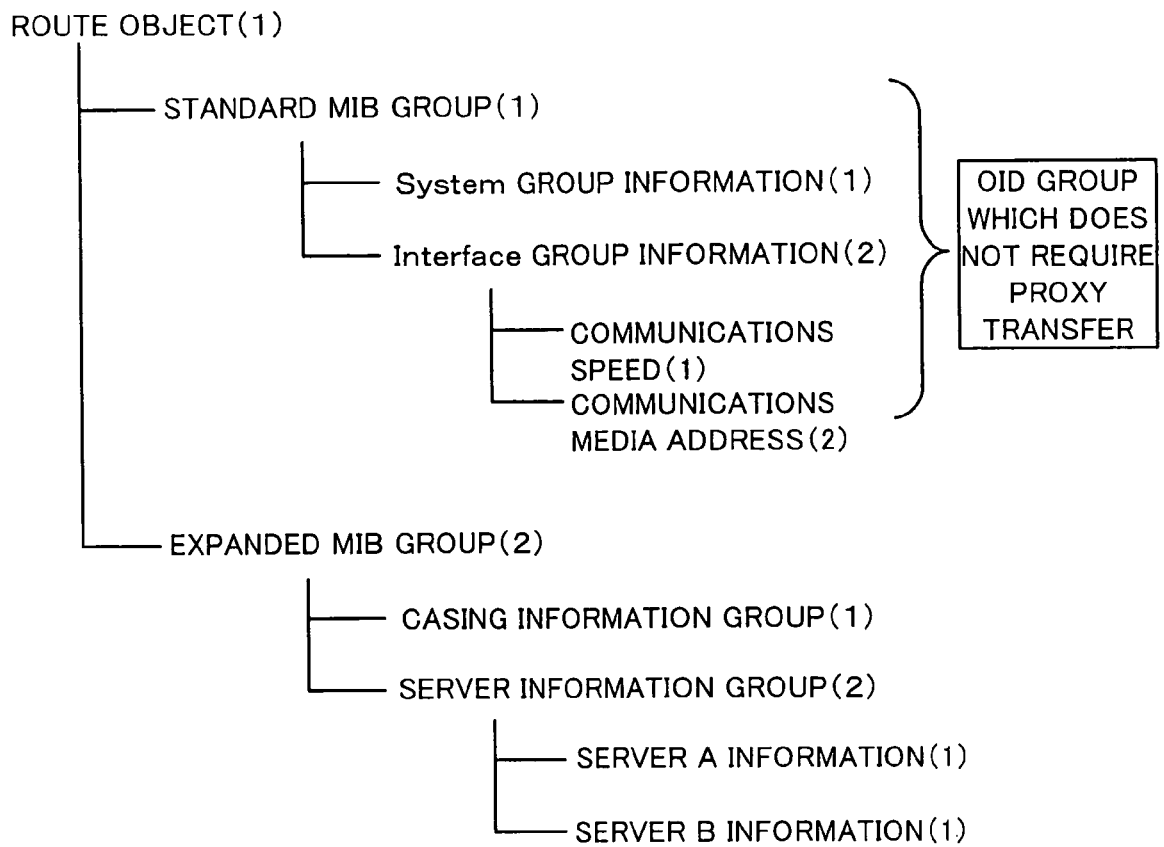
FIG. 5 is a diagram showing a configuration example of a MIB tree of the management section in the system configuration in FIG. 4.
Figure 6:
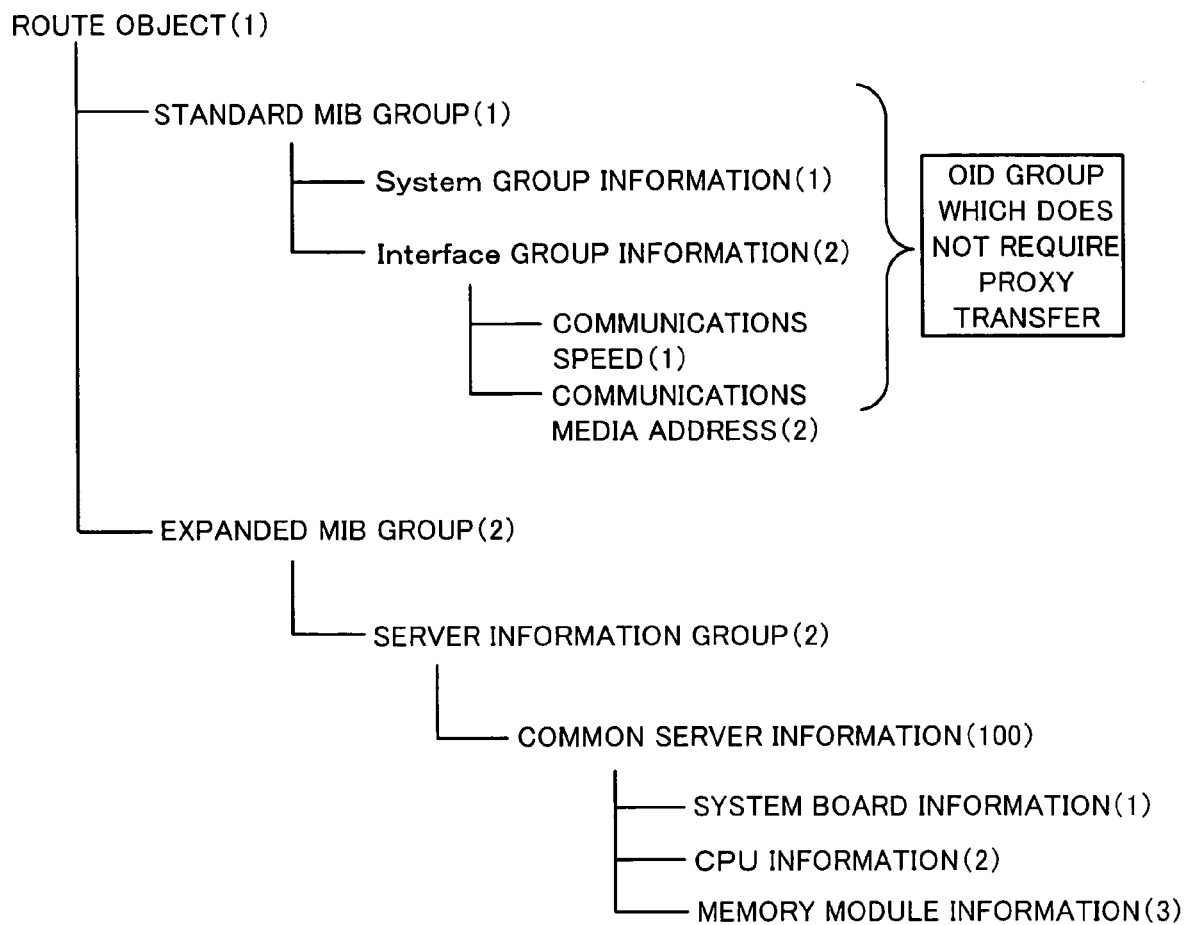
FIG. 6 is a diagram showing a configuration example of a MIB tree of the servers in the system configuration in FIG. 4.

Regarding a MIB tree of the management section 10 in FIG. 9, the configuration example in FIG. 5 is used as with the conventional examples.

In the configuration example of the MIB tree of the servers 6 and 7, the same objects "server A information" and "server B information" used as those defined in the MIB tree of the management section 10 are defined additionally under "server information group" as shown in FIG. 10. Although "server B information" object is unnecessary for the MIB tree of the server 6 and "server A information" object is unnecessary for the MIB tree of the server 7, a MIB tree common to the servers 6 and 7 is used here.

The MIB tree (FIG. 10) of the servers 6 and 7 (FIG. 10) according to this embodiment is an example of the first system table according to the present invention while the MIB tree (FIG. 5) of the management section is an example of the second system table according to the present invention.

IP addresses of the management section 10 and servers 6 and 7 in FIG. 9 are those given by expression (8). The IP addresses in expression (8) is an example of the communications address according to the present invention.

[Formula 5]

$$\left.\begin{array}{l} IP \text{ address of management section} = 10.10.10.1 \\ IP \text{ address of server } A = 10.10.10.10 \\ IP \text{ address of server } B = 10.10.10.20 \end{array}\right\} \quad (8)$$

FIG. 11 is a diagram showing an example of a correspondence table owned by the automatic SNMP proxy setting functional section 17 of the management section 10.

The correspondence table establishes correspondence between the OID (an example of the server ID according to the present invention) of a server identification object and IP address (an example of the communications address according to the present invention) both assigned to each server. The IP addresses of the servers 6 and 7 are registered in the correspondence table upon notification from the respective servers 6 and 7.

The automatic SNMP proxy setting functional section 17 of the management section 10 has a correspondence table of correspondence between the OID of the server identification object and IP address both assigned to each server as shown in FIG. 11 and automatically makes proxy settings such as those shown in expressions (9) and (10) with reference to the correspondence table.

[Formula 6]

$$\text{proxy } 10.10.10.10 \ .1.2.2.1 \ .1.2.2.100 \quad (9)$$

$$\text{proxy } 10.10.10.20 \ .1.2.2.2 \ .1.2.2.100 \quad (10)$$

The automatic SNMP proxy setting functional section 17 of the server 6 searches for the OID (.1.2.2.1) of the server identification object which corresponds to its own IP address (10.10.10.10) with reference to the correspondence table existing in the management section 10 and shown in FIG. 11 and makes proxy settings such as those shown in expression (11) automatically. Similarly, proxy settings such as those shown in expression (12) are made automatically for the server 7.

This function also works when the IP address of a server is changed: the management section 10 is informed of the changed IP address of the server, the correspondence table in FIG. 11 is updated, and proxy settings of the servers 6 and 7 are updated as well. If SNMP proxy settings are made not only for the management section 10, but also for the servers 6 and 7 in this way, in the example of expression (11), an object with an OID (an example of the server ID according to the present invention) of ".1.2.2.1" ordered from the server 6 is converted into an object with an OID (an example of the common server ID according to the present invention) of ".1.2.2.100" in the MIB tree of the server 6 itself, as in the case of an object ordered from the management section.

In the case of expression (12) an object with an OID of ".1.2.2.2" ordered from the server 7 is converted into an object with an OID of ".1.2.2.100" in the MIB tree of the server 7 itself.

[Formula 7]

$$\text{proxy localhost } .1.2.2.1 \ .1.2.2.100 \quad (11)$$

$$\text{proxy localhost } .1.2.2.2 \ .1.2.2.100 \quad (12)$$

Figure 7:
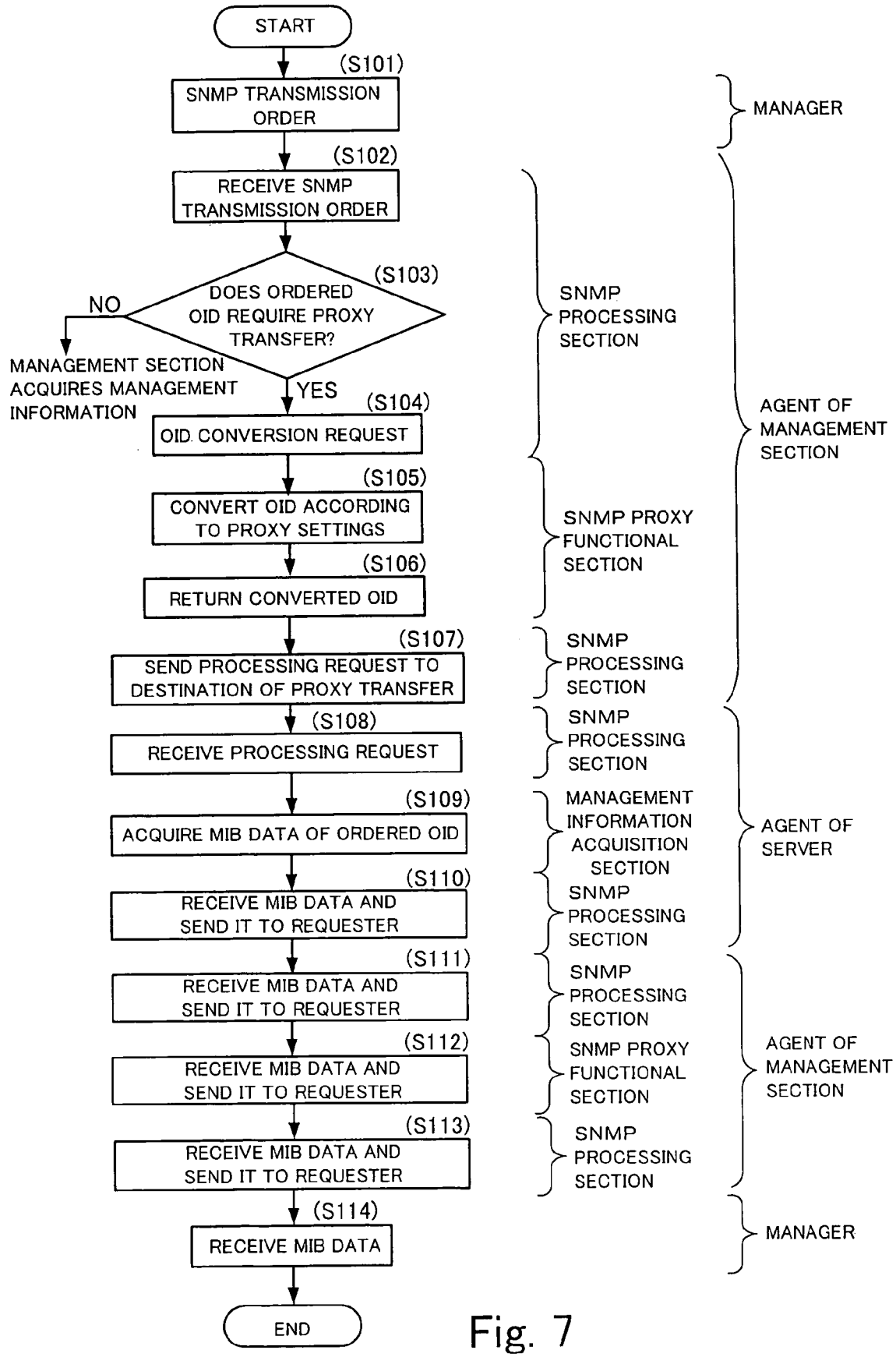
FIG. 7 is a flowchart of processes performed by the manager to acquire management information (MIB data) following the route indicated by solid lines in FIG. 4.
Figure 8:
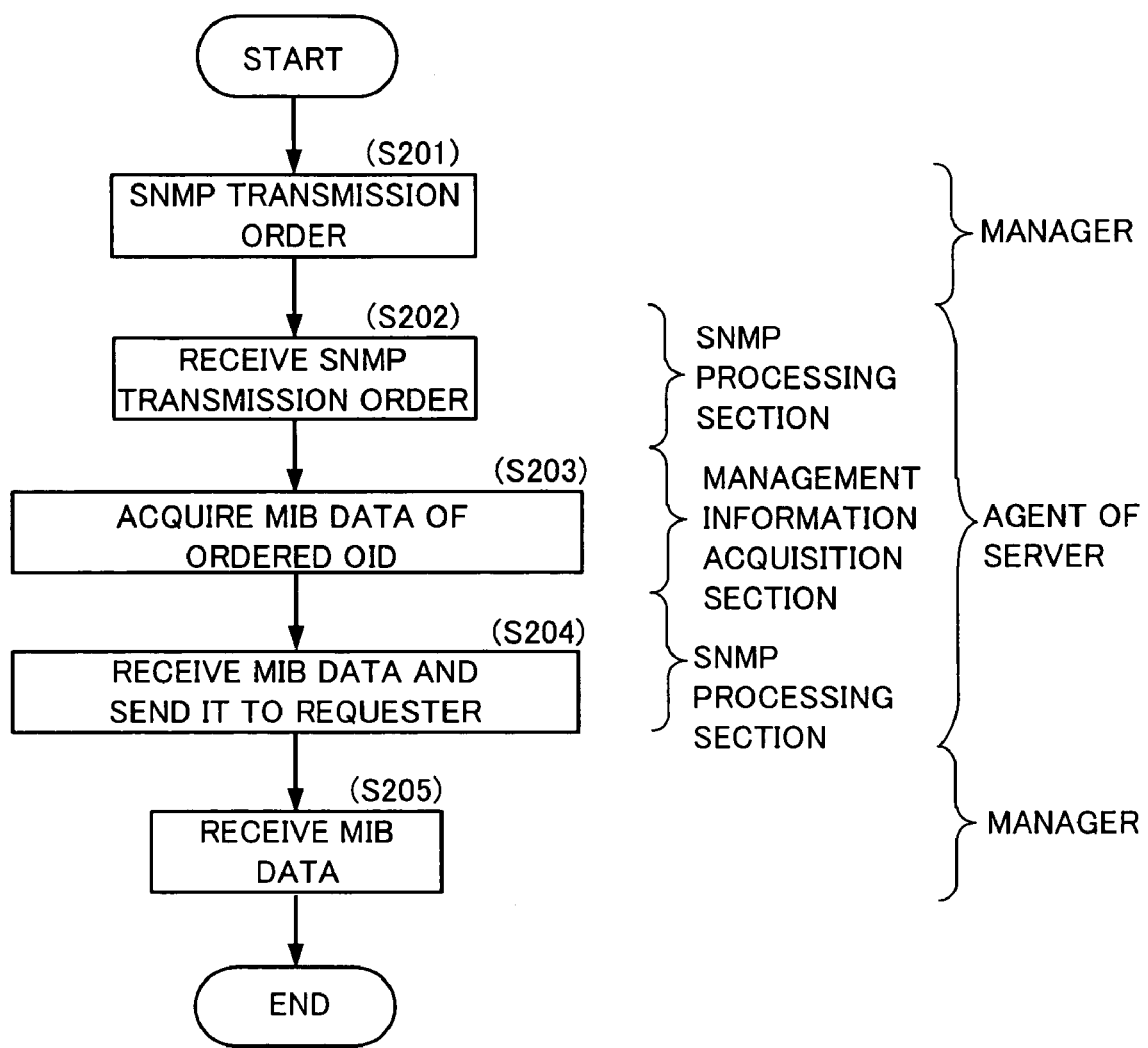
FIG. 8 is a flowchart of processes performed by the manager 1 to acquire management information (MIB data) following the route indicated by broken lines in FIG. 4.

In such a case, if it is desired to acquire memory module information about the servers 6 and 7 via the agent 2 of the management section 10, if an snmp command such as the one given by expression (13) is executed by the manager 1 with respect to the SNMP processing section 3 of the management section 10, the SNMP processing section 3 makes a processing request to the SNMP proxy functional section 14 because it can be seen, by comparing the settings of expression (9) with the ordered OID, that proxying is required. With reference to settings of expression (9), the SNMP proxy functional section 14 converts ".1.2.2.1" in the OID into ".1.2.2.100", states that the IP address is 10.10.10.10, and returns the resulting OID to the SNMP processing section 3. The SNMP processing section 3 of the agent 2 of the management section 10 requests the SNMP processing section 3 of the server 6 whose IP address is 10.10.10.10 to acquire information. The SNMP processing section 3 of the server 6 acquires memory module information whose OID is ".1.2.2.100.3" from the management information acquisition section 5 and passes the acquired information to the manager 1 via the agent 2 of the management section 10. Similarly, by executing an snmp command such as the one given by expression (14), it is possible to acquire memory module information about the server 7 via the agent 2 of the management section 10. The flow of processes is the same as the one shown in FIG. 7.

[Formula 8]

$$\text{snmpget } 10.10.10.1 \ .1.2.2.1.3 \quad (13)$$

$$\text{snmpget } 10.10.10.1 \ .1.2.2.2.3 \quad (14)$$

To acquire memory module information by accessing the server 6 directly, the manager 1 executes an snmp command such as the one given by expression (15) with respect to the SNMP processing section 3 of the server 6, the SNMP processing section 3 requests the SNMP proxy functional section 14 to convert the OID because it can be seen, by comparing the settings of expression (11) with the ordered OID, that proxying is required. With reference to settings of expression (11), the SNMP proxy functional section 14 converts ".1.2.2.1" in the OID into ".1.2.2.100" and returns the resulting OID to the SNMP processing section 3. The SNMP processing section 3 of the server 6 acquires memory module information whose OID is ".1.2.2.100.3" from the management information acquisition section 5 and passes the acquired information to the SNMP processing section 3, which then passes the acquired information to the manager 1.

Similarly, by executing an snmp command such as the one given by expression (16), it is possible to acquire memory module information about the server 7 by accessing the server 7 directly.

[Formula 9]

$$\text{snmpget } 10.10.10.10 \ .1.2.2.1.3 \quad (15)$$

$$\text{snmpget } 10.10.10.20 \ .1.2.2.2.3 \quad (16)$$

By comparing expression (13) with expression (15) or by comparing expression (14) with expression (16), it can be seen that the manager 1 can specify the same OID even when acquiring the same management information via different routes 15 and 16.

Figure 12:
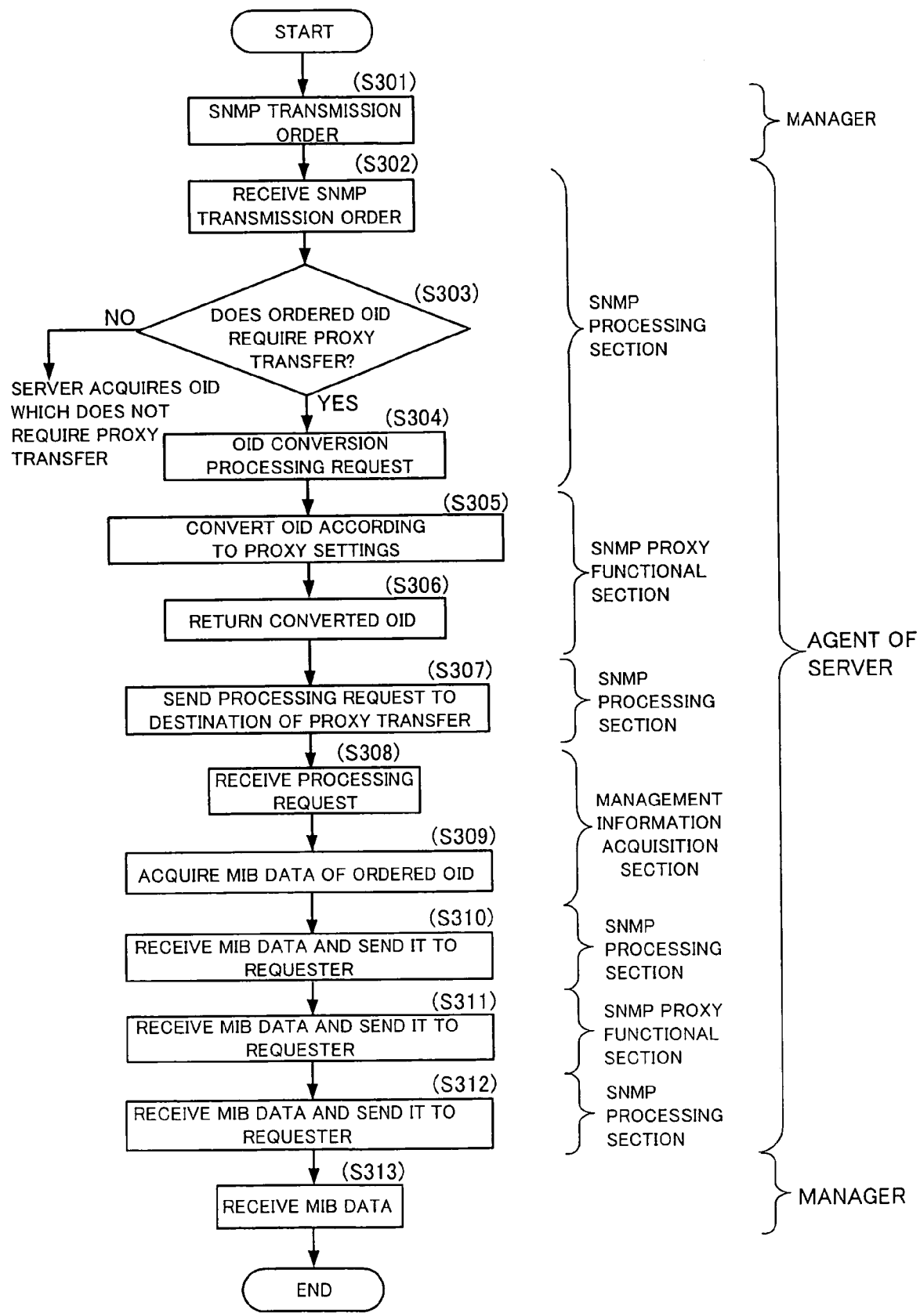
FIG. 12 is a flowchart of processes performed by the manager to acquire management information following the route indicated by broken lines in FIG. 9.

FIG. 12 is a flowchart of processes performed by the manager 1 to acquire management information following the route 15 indicated by broken lines in FIG. 9.

The manager 1 gives an SNMP transmission order to the SNMP processing section 3 of the agent 2 (step S301) of the server 6 (or the server 7). Upon receiving the SNMP transmission order (step S302), the SNMP processing section 3 of the server 6 judges whether the ordered OID requires proxy transfer (step S303). If it is found that proxy transfer is required, the SNMP processing section 3 requests the SNMP proxy functional section 14 within the server 6 to convert the OID (step S304).

Incidentally, if the ordered OID does not require proxy transfer (see "OID group which does not require proxy transfer" in FIG. 10), the management information acquisition section 5 of the server 6 acquires management information about the desired object in the server 6 and sends it to the manager 1.

If the ordered OID requires proxy transfer (step S303), the SNMP proxy functional section 14 is requested to convert the OID (step S304). The SNMP proxy functional section 14 converts the OID with reference to proxy settings of expressions (11) (step S305) and returns the converted OID to the SNMP processing section 3 (step S306) The SNMP processing section 3 of the server 6 sends the converted OID to the destination of proxy transfer (management information acquisition section 5 of the server 6) together with a processing request (step S307). When the management information acquisition section 5 of the server 6 receives the processing request (step S308), it acquires MIB data of the ordered OID (step S309). The SNMP processing section 3 of the server 6 receives the MIB data from its own management information acquisition section 5 and sends it to the requesting SNMP proxy functional section 14 once (step S310). The SNMP proxy functional section 14 receives the MIB data and sends it to the requesting SNMP processing section 3 (step S311), the SNMP processing section 3 receives the MIB data again and sends it to the requesting manager 1 (step S312), and the manager 1 receives the MIB data (step S313).

As described above, according to this embodiment, not only the management section 10, but also the servers use SNMP proxy functions. Also, the same objects as those defined in the MIB tree of the management section 10 are defined in the MIB tree of each server and SNMP proxy settings are made for each server in such a way as to convert the OIDs of the defined objects into desired OIDs in the MIB tree of the server itself.

Thus, according to this embodiment, the manager can acquire server management information via any of two routes without the need to specify different OIDs depending on the acquisition route. Consequently, even if the management section goes down, the manager can acquire management information on a server only by changing the target IP address. This improves reliability and reduces management loads. Also, since SNMP proxy setting is automated, this embodiment saves the user the trouble of making settings as well as eliminates setting errors. Besides, this embodiment can accommodate changes in the IP addresses of the management section or server domains flexibly.

What is claimed is:

1. An information management system comprising:
at least one information processing apparatus; and
a management information acquiring apparatus which acquires management information stored in the at least one of information processing apparatuses;
each information processing apparatus including at least the following,
a management information acquisition section to acquire management information stored in the information processing apparatus, and
a communications section to receive a management information transmission order containing a first ID and a management information transmission order containing a second ID,
the first ID being an ID of a requested object and including an ID of the information processing apparatus, the ID of the information processing apparatus being usable to distinguish the information processing apparatus from another one of the at least one information processing apparatus,
the second ID being an ID of the requested object and including an ID of a common information processing apparatus, the ID of the common information processing apparatus not being usable to distinguish between the information processing apparatuses, and
a first ID conversion section to convert the first ID into the second ID which represents the same requested object represented by the first ID,
the management information acquisition section acquires the management information, which is the requested object identified by the second ID, and
the communications section sends the management information acquired by the management information acquisition section to an orderer of the management information,
the management information acquiring apparatus including at least the following,
a first communications section to receive a management information transmission order containing a third ID from an external manager,
the third ID being an ID of the requested object and including an ID of one of the at least one information processing apparatus,
a second ID conversion section to convert the third ID contained in a management information transmission order received by the first communications section into the second ID, and
a second communications section to send a management information transmission order containing the second ID obtained by the second ID conversion section to the one of the at least one information processing apparatus and to receive management information returned from the one of the least one information processing apparatus,
the first communications section sends the management information received by the second communications section to the external manager which is the orderer of the management information, and
the communications section of each of the at least one information processing apparatus is capable of directly receiving, from the external manager, without intervention of the management information acquisition section, the management information transmission order containing the first ID.

2. The information management system according to claim 1 wherein:
the first ID conversion section comprises:

a first conversion table which associates the ID of the information processing apparatus with the ID of the common information processing apparatus, and a first system table which contains the ID of the information processing apparatus and the ID of the common information processing apparatus and describes a system of IDs of objects which are targets whose management information is transmitted, the system of the IDs being linked to the ID of the common information processing apparatus and being common among all of the at least one information processing apparatus; and the first ID conversion section converts the first ID into the second ID with reference to the first conversion table and the first system table.

3. The information management system according to claim 1 wherein:

the second ID conversion section comprises:

a second conversion table which associates a communications address of each of the at least one information processing apparatus, the ID of each of the at least one information processing apparatus, and the ID of the common information processing apparatus, and a second system table which contains the ID of each of the at least one information processing apparatus and the ID of the common information processing apparatus and describes a system of IDs of objects which are targets whose management information is transmitted, the system of the IDs being linked to the ID of the common information processing apparatus and being common among all the at least one information processing apparatus; and the second ID conversion section converts the third ID into the second ID with reference to the second conversion table and the second system table.

4. The information management system according to claim 3 wherein:

the management information acquiring apparatus comprises:

a correspondence table which associates the communications address of each of the at least one information processing apparatus and the information processing apparatus ID of each of the at least one information processing apparatus with each other, and a second conversion table creating section which creates the second conversion table with reference to the correspondence table.

5. The information management system according to claim 4 wherein the second conversion table creating section manages the correspondence table and makes additions/updates to the second conversion table in accordance with additions/updates to the correspondence table.

6. The information management system according to claim 4 wherein:

the first ID conversion section comprises:

a first conversion table which associates the ID of the information processing apparatus with the ID of the common information processing apparatus, and a first system table which contains the ID of the information processing apparatus and the ID of the common information processing apparatus and describes a system of the IDs of objects which are targets whose management information is transmitted, the system of the IDs being linked to the ID of the common information processing apparatus and being common among all of the at least one information processing apparatus;

the first ID conversion section converts the first ID into the second ID with reference to the first conversion table and the first system table; and each of the at least one information processing apparatus comprises a first conversion table creating section which creates the first conversion table with reference to the correspondence table in the management information acquiring apparatus.

7. An information processing apparatus in an information management system having at least one information processing apparatus and a management information acquiring apparatus which acquires management information stored in the at least one information processing apparatus, the information processing apparatus comprising:

a management information acquisition section to acquire management information stored in the information processing apparatus;

a communications section to receive a management information transmission order containing a first ID and a management information transmission order containing a second ID, the first ID being an ID of a requested object and including an ID of the information processing apparatus, the ID of the information processing apparatus being usable to distinguish the information processing apparatus from another one of the at least one information processing apparatus, the second ID also being an ID of a requested object and including an ID of a common information processing apparatus, the ID of the common information processing apparatus not being usable to distinguish between the information processing apparatuses; and a first ID conversion section to convert the first ID contained in a management information transmission order received by the communications section into the second ID which represents the same requested object represented by the first ID, wherein the management information acquisition section acquires the management information, which is the requested object identified by the second ID, and the communications section sends the management information acquired by the management information acquisition section to an orderer of the management information, and the communications section of the information processing apparatus is capable of directly receiving, from an external manager, without intervention of the management information acquisition section, the management information transmission order containing the first ID.

8. The information processing apparatus according to claim 7 wherein:

the first ID conversion section comprises:

a first conversion table which associates the ID of the information processing apparatus with the ID of the common information processing apparatus, and a first system table which contains the ID of the information processing apparatus and the ID of the common information processing apparatus and describes a system of the IDs of objects which are targets whose management information is transmitted, the system of the IDs being linked to the ID of the common information processing apparatus and being common among all of the at least one information processing apparatus; and the first ID conversion section converts the first ID into the second ID with reference to the first conversion table and the first system table.

9. The information processing apparatus according to claim 8, wherein:
   the management information acquiring apparatus comprises:
   a correspondence table which associates the communications address of each of the at least one information processing apparatus and the ID of each of the at least one information processing apparatus with each other, and
   a second conversion table creating section which creates the second conversion table with reference to the correspondence table.

10. A computer-readable storage medium storing an information providing program that is executed in a first computer of an information management system that includes the first computer and a second computer that acquires management information stored in the first computer, the information providing program being executed in the first computer to cause the first computer to perform the following operations:
   acquiring management information stored in the first computer;
   receiving a management information transmission order containing a first ID and management information transmission order containing a second ID,
   the first ID being an ID of the requested object and including a first computer ID of the first computer ID, the first computer ID being usable to distinguish the first computer from other computers,
   the second ID also being an ID of the requested object and including a common ID, the common ID not being usable to distinguish between the first computer from the other computers; and
   converting the first ID contained in a management information transmission order received by a communications section into a second ID,
   wherein the acquiring management information acquires management information, which is the given object identified by the second ID,
   the communications section sends the acquired management information to an orderer of the management information, and
   the first computer is capable of directly receiving, from an external manager, without intervention of the second computer, the management information transmission order containing the first ID.

11. The computer-readable storage medium according to claim 10, wherein the program being executed in the first computer further causes the first computer to perform:
   associating the first computer ID with the common ID;
   storing the associations in the first conversion table;
   storing a first system table which contains the first computer ID of the first computer and the common first computer ID and describes a system of the IDs of objects which are targets whose management information is transmitted, the system of the IDs being linked to the common first computer ID; and
   the converting converts the first ID into the second ID with reference to the first conversion table and the first system table.

12. The computer-readable storage medium according to claim 11, wherein the second computer stores a correspondence table which associates the communications address of the first computer and the other computers with each other, and a second conversion table creating section which creates the second conversion table with reference to the correspondence table.

13. The system according to claim 1, wherein the at least one information processing apparatus and the management information acquiring apparatus function according to a common protocol, and the first ID, second ID and third ID are consistent with the common protocol.

14. The system according to claim 1, wherein the common protocol is Simple Network Management Protocol.

* * * * *